C. C. SNODGRASS.
TROLLEY.
APPLICATION FILED NOV. 24, 1911.
1,024,290.
Patented Apr. 23, 1912.
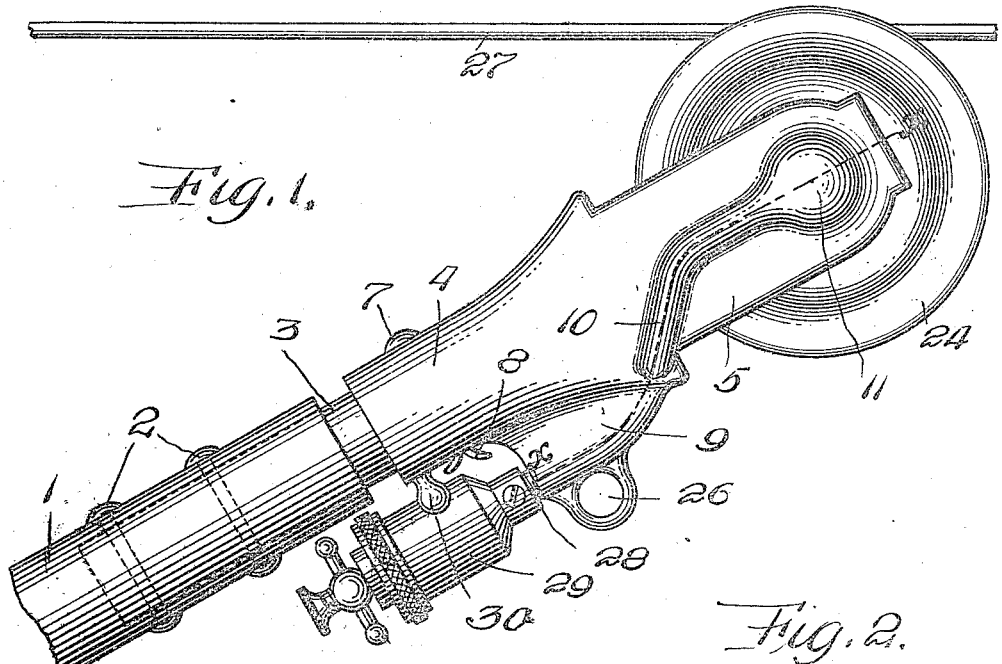
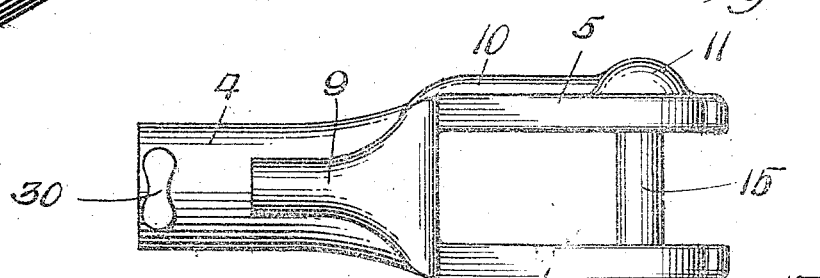
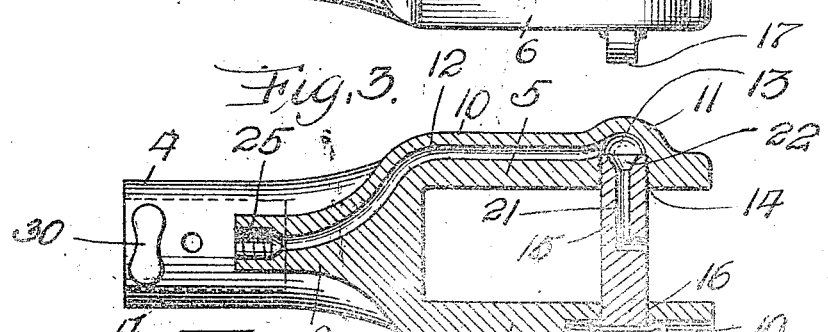
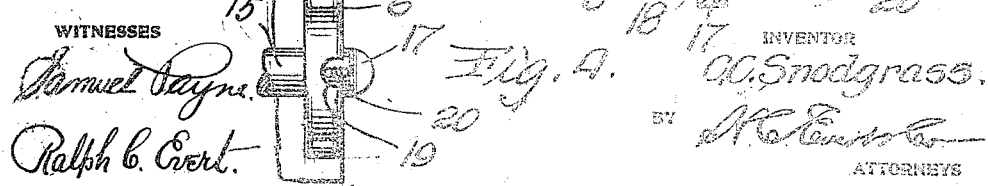
WITNESSES
Samuel Payne
Ralph C. Evert
INVENTOR
C. C. Snodgrass
BY
ATTORNEYS

UNITED STATES PATENT OFFICE.

CHARLES C. SNODGRASS, OF NEW MARTINSVILLE, WEST VIRGINIA, ASSIGNOR OF ONE-HALF TO ISAIAH D. MORGAN, OF NEW MARTINSVILLE, WEST VIRGINIA.

TROLLEY.

1,024,290.  Specification of Letters Patent.  Patented Apr. 23, 1912.

Application filed November 24, 1911. Serial No. 662,163.

*To all whom it may concern:*

Be it known that I, CHARLES C. SNODGRASS, a citizen of the United States of America, residing at New Martinsville, in the county of Wetzel and State of West Virginia, have invented certain new and useful Improvements in Trolleys, of which the following is a specification, reference being had therein to the accompanying drawing.

This invention relates to trolleys and more particularly to lubricators for the journal pin and wheel of the trolley harp.

The primary object of my invention is the provision of novel means, in a manner as will be hereinafter set forth, for using a pressure lubricator in connection with the trolley harp, for thoroughly lubricating the journal pin and trolley wheel, whereby friction and wear will be reduced to a minimum.

Another object of this invention is to provide positive and reliable means for locking a journal pin in a trolley harp, whereby said pin cannot become accidentally displaced.

A further object of this invention is to provide a trolley harp and lubricator that can be used in connection with various types of trolley poles.

A still further object of this invention is to accomplish the above results by a mechanical construction that is durable, inexpensive to manufacture and highly efficient for the purposes for which it is intended.

With the above and other objects in view the invention resides in the novel construction, combination and arrangement of parts to be hereinafter specifically described and then claimed.

Reference will now be had to the drawing, wherein—

Figure 1 is a side elevation of a trolley in accordance with this invention. Fig. 2 is a bottom plan of the trolley harp. Fig. 3 is a horizontal sectional view of the trolley harp on line *x—x* of Fig. 1, and Fig. 4 is an end view of one of the arms of the harp.

The reference numeral 1 denotes the upper end of a tubular trolley pole and secured in the upper end of said pole are rivets 2 or other fastening means is a coupling piece 3 upon the end of which is mounted the socket 4 of the trolley harp, said harp having oppositely disposed arms 5 and 6. The socket 4 is retained upon the coupling piece 3 by a cotter pin 7. The harp is secured on the coupling piece 3 a proper distance and the cotter pin 7 is then placed in an opening to keep the harp from coming off. By putting the harp on in this manner, vibration is eliminated, giving good contact for current passing down to motors. The pin 7 extending through the coupling piece and having the split end thereof clenched, as at 8.

The under side of the harp, adjacent to the arms 5 and 6, is provided with an enlargement 9 and the arm 5 has an angularly disposed rib 10 terminating at a boss 11 carried by the outer side of the arm 5. The enlargement 9 and the rib 10 are provided with a port 12 extending from the rear end of the enlargement 9 to the boss 11, said port being in communication with a recess 13 formed in the boss with said recess in communication with an opening 14 having the walls thereof screw threaded.

Screwed into the opening 14 is the threaded end of a journal pin 15, said pin having the opposite end thereof in an opening 16 provided therefor in the arm 6. The outer end of the pin 15 is reduced to form a shank 17, whereby a wrench or other instrument can be employed for screwing the journal pin into the arm 5. The outer end of the journal pin has a transverse opening 18 in communication with a longitudinal groove 19 formed in the outer side of the arm 6, at the end thereof. Mounted in the opening 18 is a cotter pin 21 that has the ends thereof within the groove 19 to prevent the journal pin 15 from rotating after having been mounted in the arms of the harp. The journal pin 15 has a longitudinal port 21 having one end thereof flared, as as 22 and in communication with the recess 13. The opposite end of the port terminates at a point intermediate the ends of the journal pin and is in communication with a duct 22.

Revolubly mounted upon the journal pin 15 is a trolley wheel 24 of the ordinary and well known type and the bore of this wheel is adapted to be lubricated by a lubricant passing through the duct 12, recess 13 and ducts 21 and 22.

The rear end of the enlargement 9 has a socket 25 with the walls thereof screw threaded, and said enlargement is provided with a depending eye 26 to which a cord or rope can be attached to lower the trolley or remove the wheel 24 from a trolley wire or electric conductor 27. Mounted in the socket 25 of the enlargement 9 is a coupling pipe 28 to which is connected a pressure lubricator 29.

The pressure lubricator is of the ordinary and well known type embodying a reservoir containing a piston that can be adjusted to force lubricant into the ducts 12, 21 and 22. The lubricator 29 is braced by an arm 30 carried by the under side of the harp socket 4.

It is thought that the operation and utility of the lubricator will be apparent without further description, and while in the drawing there is illustrated a preferred embodiment of the invention, it is to be understood that the structural elements are susceptible to such variations as fall within the scope of the appended claims.

What I claim is:—

1. In a trolley, a harp body, oppositely disposed arms carried thereby, an enlargement carried by the under side of said harp body, said enlargement and one of said arms having a duct formed therein, a journal pin mounted in said arms and having ducts formed therein in communication with the duct of said enlargement and said arm, a trolley wheel revolubly mounted upon said pin, and a pressure lubricator carried by said enlargement and in communication with the duct thereof.

2. In a trolley, a harp body, oppositely disposed arms carried thereby, an enlargement carried by the under side of said harp body, said enlargement and one of said arms having a duct formed therein, a journal pin mounted in said arms and having ducts formed therein in communication with the duct of said enlargement and said arm, a trolley wheel revolubly mounted upon said pin, a pressure lubricator carried by said enlargement and in communication with the duct thereof, and an arm carried by the under side of said harp body for bracing said pressure lubricator.

3. In a trolley, a harp body, oppositely disposed arms carried thereby, an enlargement carried by the under side of said harp body, said enlargement having a duct formed therein extending into one of said arms, a journal pin extending through one of said arms and having the end thereof mounted in the arm provided with the extended duct of said enlargement, said pin having ducts formed therein in communication with the duct of said enlargement, a trolley wheel revolubly mounted upon said pin, a cotter pin extending through the end of said journal pin and engaging in the outer wall of one of said arms to prevent said journal pin from rotating, and a pressure lubricator carried by said enlargement and in communication with the duct thereof.

4. In a trolley, a harp body, oppositely disposed arms carried thereby, an enlargement carried by the under side of said harp body, said enlargement having a duct formed therein extending into one of said arms, a journal pin extending through one of said arms and having the end thereof mounted in the arm provided with the extended duct of said enlargement, said pin having ducts formed therein in communication with the duct of said enlargement, a trolley wheel revolubly mounted upon said pin, a cotter pin extending through the end of said journal pin and engaging in the outer wall of one of said arms to prevent said journal pin from rotating, a pressure lubricator carried by said enlargement and in communication with the duct thereof, an arm carried by the under side of said harp body for bracing said lubricator, and an eye carried by the under side of said enlargement.

In testimony whereof I affix my signature in the presence of two witnesses.

CHARLES C. SNODGRASS.

Witnesses:
S. E. POSTLETHWAIT,
A. E. PATTERSON.